(12) United States Patent
Pazos et al.

(10) Patent No.: US 8,880,327 B2
(45) Date of Patent: Nov. 4, 2014

(54) METHOD, APPARATUS AND COMPUTER PROGRAM FOR DETERMINING THE LOCATION OF A USER IN AN AREA

(71) Applicant: International Business Machines Corporation, Armonk, NY (US)

(72) Inventors: Fernando Pedrazzoli Pazos, Madrid (ES); Jacques C. Van Belle, La Foret (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/788,077

(22) Filed: Mar. 7, 2013

(65) Prior Publication Data

US 2013/0184983 A1    Jul. 18, 2013

Related U.S. Application Data

(63) Continuation of application No. 11/545,292, filed on Oct. 10, 2006, now Pat. No. 8,401,781.

(30) Foreign Application Priority Data

Oct. 18, 2005   (EP) ................... 05300833.0

(51) Int. Cl.
*G01C 21/00* (2006.01)
*G01C 21/20* (2006.01)

(52) U.S. Cl.
CPC ............ *G01C 21/206* (2013.01); *G01C 21/005* (2013.01)
USPC ........... 701/207; 701/400; 701/408; 701/431; 701/433; 701/434; 701/467; 701/500; 701/501; 340/944; 702/150

(58) Field of Classification Search
None
See application file for complete search history.

(56) References Cited

U.S. PATENT DOCUMENTS

| | | | | |
|---|---|---|---|---|
| 6,396,413 B2 * | 5/2002 | Hines et al. | ..................... | 340/8.1 |
| 6,473,704 B1 * | 10/2002 | Ito et al. | .......................... | 702/94 |
| 6,963,282 B1 * | 11/2005 | Yeates et al. | ............... | 340/572.4 |
| 6,992,574 B2 * | 1/2006 | Aupperle et al. | ............. | 340/505 |
| 7,119,738 B2 * | 10/2006 | Bridgelall et al. | ............. | 342/129 |
| 7,199,725 B2 * | 4/2007 | Gilfix et al. | ................... | 340/4.14 |

(Continued)

FOREIGN PATENT DOCUMENTS

WO    WO 2005071597 A1 *   8/2005    ............... G06K 7/00

OTHER PUBLICATIONS

Office Action dated Apr. 1, 2009 regarding U.S. Appl. No. 11/545,292, 12 pages.

(Continued)

*Primary Examiner* — Jonathan M Dager
(74) *Attorney, Agent, or Firm* — Scully, Scott, Murphy & Presser PC; John Pivnichny

(57) ABSTRACT

Apparatus for orientating a user in a space wherein the space comprises a plurality of zones of which only certain zones constitute functional zones wherein each functional zone includes a first type device containing information relating to the position of the zone in the space and wherein the first type device is reactive to the presence of a second type device associated with the user to provide the user with the information to determine the orientation of the user in the space. A method of orientating the user within the space and guiding the user toward one or more features in the space is also disclosed.

15 Claims, 4 Drawing Sheets

(56) References Cited

U.S. PATENT DOCUMENTS

| | | | |
|---|---|---|---|
| 7,242,303 B2* | 7/2007 | Patel et al. | 340/572.4 |
| 7,267,281 B2* | 9/2007 | Hopkins | 235/462.45 |
| 7,403,120 B2* | 7/2008 | Duron et al. | 340/572.1 |
| 7,778,112 B2* | 8/2010 | Behm et al. | 367/116 |
| 8,401,781 B2 | 3/2013 | Pazos et al. | |
| 2003/0191602 A1* | 10/2003 | Lee et al. | 702/150 |
| 2003/0236590 A1* | 12/2003 | Park et al. | 700/245 |
| 2004/0068368 A1* | 4/2004 | Adams, Jr. et al. | 701/209 |
| 2005/0048987 A1* | 3/2005 | Glass | 455/456.1 |
| 2005/0099318 A1* | 5/2005 | Gilfix et al. | 340/825.19 |
| 2006/0077172 A1* | 4/2006 | Fukumoto et al. | 345/156 |
| 2006/0129308 A1* | 6/2006 | Kates | 701/200 |
| 2006/0286972 A1* | 12/2006 | Kates | 455/415 |
| 2007/0011919 A1* | 1/2007 | Case, Jr. | 36/132 |
| 2007/0069021 A1* | 3/2007 | Elrod et al. | 235/451 |
| 2007/0088498 A1 | 4/2007 | Pazos et al. | |
| 2007/0243942 A1* | 10/2007 | Elliott | 473/220 |
| 2008/0040951 A1* | 2/2008 | Kates | 36/136 |

OTHER PUBLICATIONS

Final Office Action, dated Oct. 22, 2009 regarding U.S. Appl. No. 11/545,292, 12 pages.

Notice of Allowance, dated Nov. 15, 2012 regarding U.S. Appl. No. 11/545,292, 8 pages.

S. Willis and S. Helal, "A Passive RFID Information Grid for Location and Proximity Sensing for the Blind User", University of Florida Technical Report No. TR04-009, http://www.cise.ufl.edu/tech_reports/tr04/tr04-009.pdf, Oct. 2004.

* cited by examiner

METHOD, APPARATUS AND COMPUTER PROGRAM FOR DETERMINING THE LOCATION OF A USER IN AN AREA

CROSS REFERENCE TO RELATED APPLICATION

This application is a continuation of U.S. patent application Ser. No. 11/545,292, filed Oct. 10, 2006 the entire content and disclosure of which is hereby incorporated herein by reference.

BACKGROUND

The present invention is directed to determination of a user location and more particularly to an apparatus to manage a location of a user in a specific space and to provide the guidance to negotiate that space.

Finding the way to a destination requires knowledge of the surroundings including landmarks, etc., and means for defining a route to the destination.

Blind people or persons with a visual impairment have to find their way to a destination but may not have as much information as a sighted person. The destination is more difficult to identify in open spaces and in new unknown areas. It is also difficult to determine whether or not a user has arrived at the required destination. It may also be necessary to identify the destination. For example if a person is trying to reach one particular room and there is a corridor of several similar rooms one after another (as normally occurs with restrooms), it would be difficult to know which is the right room to enter unless there is a sign (Braille or any other kind) mounted nearby.

Existing solutions are not suitable to solve this problem. Existing systems are able to indicate landmarks that are nearby but fail to determine the orientation (the direction being faced by the user) of the user at a given moment, thus cannot provide accurate directions and guidance to the user. For instance, the Global Positioning System (GPS) is a worldwide radio-navigation system formed from a constellation of 24 satellites and their ground stations. GPS technology brings a solution for locating the user but also brings an accuracy error. This is acceptable for other users such as automobiles being routed to a specific destination, where four meters deviation error is not a great concern. Also GPS does not work indoors and in such places accuracy is even more important.

Another solution is a location solution with a triangulation system. The system locates the source location of cellular calls by determining how long it takes a call to reach each of three cell sites, then triangulates the location. Location solutions based on cellular phones and antenna triangulation based on signal strength are also not sufficiently accurate as needed for determining a location and orientation system to work indoors and also suffers from problems of beam reflections on nearby buildings.

These two solutions are suitable to determine the user location but not the user's orientation at a given moment which is a fundamental need for a blind person.

For indoor use there is a partial solution using radio triangulation location. Radio triangulation systems have multiple antennas (acting as either transmitters, receivers or both) placed throughout a building. The signal from a device/user is picked up by multiple receiving antennas. Each of these antennas is in a known location and the distance between the transmitted signal and the received antenna is calculated. The point at which these three radii intersect is the location of the device/user. Location sensing indoor systems using triangulation have the same problem as cellular antenna triangulation of multi-path reflection. This gives a poor accuracy and error which impacts the reliability of the system.

Smart Floor solutions are also used for locating users/people. Footstep profiles of the users are registered in a database. When a user walks on specific load sensitive tiles located in the floor, the system can then recognize and locate the user. The great disadvantage of this solution is that it needs to be set up for each particular user and over the building or space. It is not suitable for the general public and therefore does not provide a solution for public spaces such as buildings.

Infrared Auditory Signage (RIAS) is another solution. This solution operates by the installation of infrared transmitters that diffuse repeated human voice messages regarding the location of the user. The user receives these messages on small, hand held or head mounted receivers. These messages can be transmitted via sound or via infrared light. RIAS systems offer a solution based on a directional beam. This system has the disadvantage of blocking and screening. This type of system is inconvenient because the user needs to be alert in advance of the location of the transmitter in order to align the receiver so the receiver can obtain the information desired.

Present Radio Frequency Identification (RFID) solutions offer relative positioning indications for users but they fail to give information relating to orientation of the user. Solutions such as RFID Grid have the inconvenience that the orientation (direction in which the user is facing) is based on two readings done consecutively after movement of the user, this adds an error factor. Also outdoor orientation is processed by an insert mounted on a housing which could be raised and a groove (or slot) in the shape of a triangle located on the top surface of it. This triangle has to be touched by the user to activate the system and thus advanced knowledge of where to find it is needed.

S. Willis and S. Helal describe a solution for the orientation of users entitled "a passive RFID information grid for location and proximity sensing for the blind user". The article describes a grid which is located indoors all over the surface of the floor. This grid allows a user to be guided sequentially from one cell to another one until a destination is reached. In this kind of system, each cell contains location information related to a defined place and a precise environment. A disadvantage of such system is that when a furniture is placed on a cell, the orientation of the user is disturbed. A second disadvantage of this system is that this grid can not be reused in another location as all cells are programmed with specific details from a defined space and can not be reprogrammed.

BRIEF SUMMARY

It is an object of the present invention to facilitate orientation of a user at a given moment and to provide, by means of any information system, accurate information about the surroundings location and orientation.

According to one aspect of the invention, there is provided an apparatus for orientating a user in a space wherein the space comprises a plurality of zones of which only certain zones constitute functional zones wherein each functional zone includes a first type device containing information relating to the position of the zone in the space and wherein the first type device is reactive to the presence of a second type device associated with the user to provide the user with the information to determine said orientation of the user in the space.

According to another aspect of the invention, there is provided a method of orientating a user within a space and guiding the user towards one or more features therein, wherein the space comprises a plurality of zones of which only certain zones constitute functional zones, and wherein the user and each functional zone include a device wherein the devices can react to one another to transfer data, the method comprising, identifying the presence of the user close to a functional zone, determining the orientation of the user within the space, and providing the user with information relating to the user orientation and to at least one feature in the space.

According to yet another aspect of the invention, there is provided a computer program comprising instructions for carrying out the steps of the method described in the preceeding paragraph, when the computer program is executed on a computer system.

BRIEF DESCRIPTION OF THE DRAWINGS

Reference will now be made, by way of example, to the accompanying drawings, in which.

DETAILED DESCRIPTION

Figure 1:
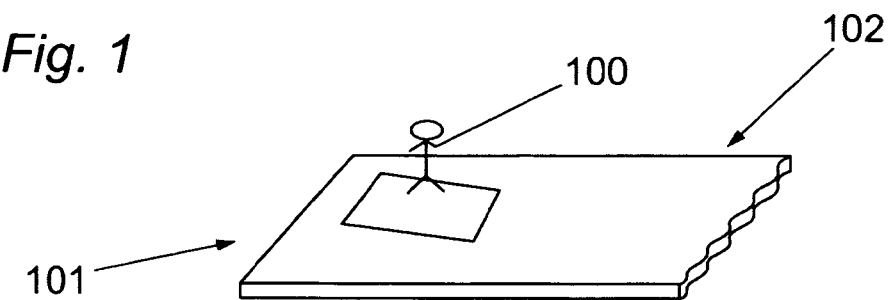
FIG. 1 is a schematic drawing showing a user walking in an area.

Referring to FIG. 1, a user 100 is located in an area 101. The user can move in this area or in and out of the area as required. Area 101 can be internal (e.g.: offices, etc.) or external (e.g.: streets, etc.). In area 101, user 100 is located on a surface coating 102. This surface coating can be tiles, asphalt or any other appropriate surface. User 100 can be accurately located in area 101 as will be described in greater detail below.

Area 101 is a place wherein a user can obtain locational information, for example a blind person who needs to know an exact location in order to negotiate a certain obstacle. In an external example this may be at a crossing on a pedestrian walkway. In an internal example the user could be located in a hall of a building in front of the elevators. In order to locate the user area 101 includes a device which is made of different layers disposed on a ground coating.

Figure 2:
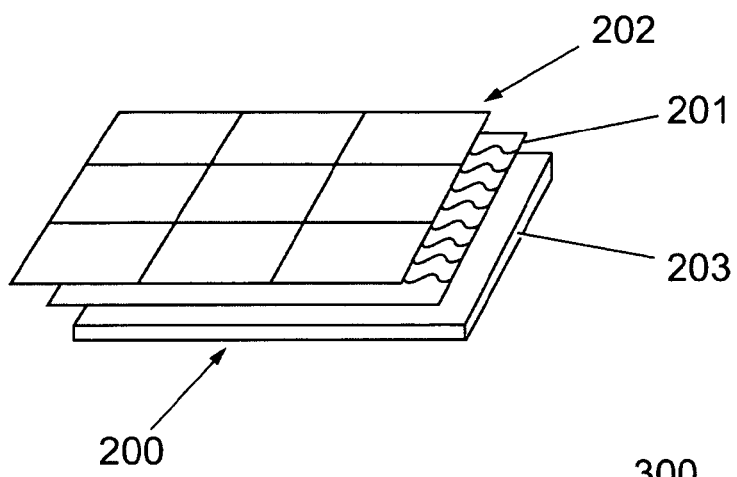
FIG. 2 is a cross-section showing the structure of the specific zone in the area of FIG. 1.
Figure 3:
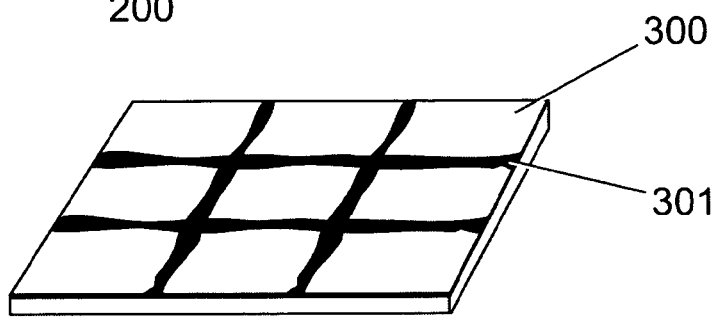
FIG. 3 is a detailed view of the surface for the area of FIG. 1.
Figure 4:
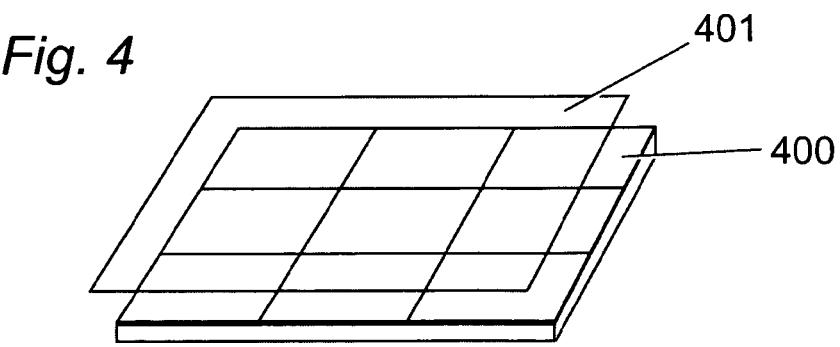
FIG. 4 is a drawing showing another kind of surface for the area of FIG. 1.
Figure 5:
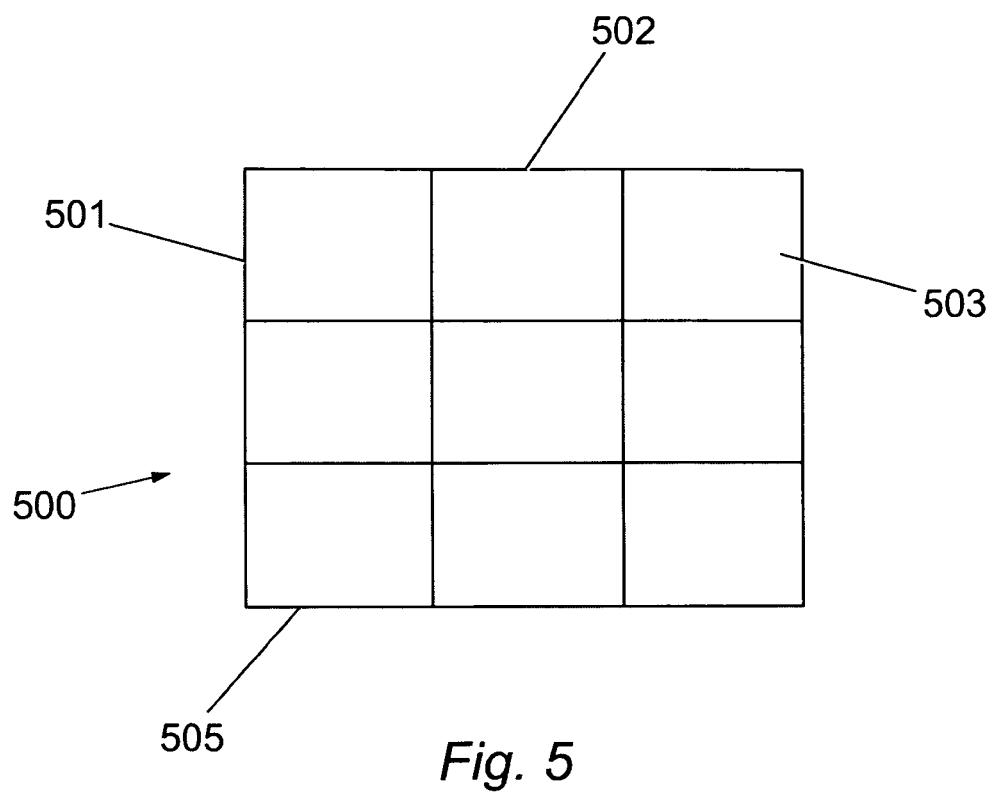
FIG. 5 is a drawing showing the grid pattern formed by RFID tags in the system, according to the present invention.

FIG. 2 shows a cross-section of an area 200 identifying the formation thereof. The first layer comprises an adhesive 201. Adhesive 201 fixes a large element 202 to a ground coating 203. As shown in FIG. 3, an element 300 can be partially covered by a rugged material 301. As shown in FIG. 4, an element 400 can also be totally covered by a rugged material 401. As shown in FIG. 5, an element 500 contains a number of elements (501, 502, 503, 504, etc.) on the same plane. In this example there are nine elements. The elements (501, 502, 503, 504, etc.) are disposed to form a grid pattern 505 as shown in FIG. 5. Each side of grid pattern 505 is made with three aligned elements. Each element can be identified by a name. For a grid pattern with nine surfaces, the names may be t1, t2, t3, t4, t5, t6, t7, t8 and t9. These codes represent the geographic position of each element: t1 for front left, t2 for front center, t3 for front right, t4 for middle left, t5 for middle center, t6 for middle right, t7 for back left, t8 for back center and t9 for back right.

In the present example each element includes an RFID tag. These RFID tags may be passive so that no power supply is necessary, however in other example different types of RFID tags may be used. Also for different applications and requirements the elements may include a different type of marker, as will described in greater detail below. The RFID tag or other type of marker may contain information. This information may comprise the names such as t1 to t9.

In an alternative embodiment, an element may also be installed in the ground coating. In this situation, the ground coating has to be specifically made from a material that does not affect the transmission of the radio frequencies from the RFID tags.

If the element, which contains the tags, has no rugged surface, a second layer is disposed over the element. This second layer is made of a rugged material or any other appropriate material. This second layer can be similar to the one used on sidewalks to warn pedestrians that they reached the edge of the sidewalk. The second layer uniformly covers the surface of the ground coating at the location of the device.

The second layer can also be disposed in order to alternate one surface without a second layer with a second surface having a second layer at the location of the device. The second layer is made from a material that does not affect the transmission of the radio frequencies from the RFID tags.

Figure 6:
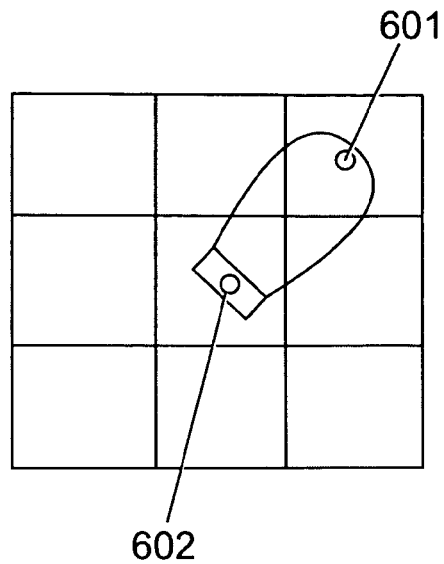
FIG. 6 is a top view of the shoe of a user standing on the grid of FIG. 5.
Figure 7:
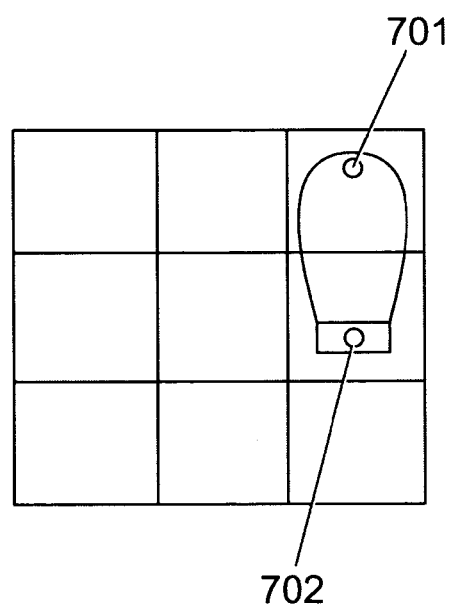
FIG. 7 is a further top view of the shoe of the user standing on the grid of FIG. 5.

As shown in FIG. 6 and FIG. 7 the user stands above the surface containing the grid of RFID tags, so that the shoes of the user are located substantially above the device.

Figure 8:
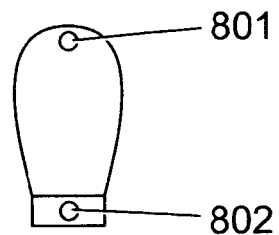
FIG. 8 is a drawing showing the shoe of the user containing two RFID readers.

As shown in FIG. 8, one of the shoes, for example the right one 800 comprises two RFID readers. One RFID reader 801 is disposed in the tip of the shoe and the other 802 is in the heel of the shoe. RFID readers can also be located in both shoes.

Figure 9:
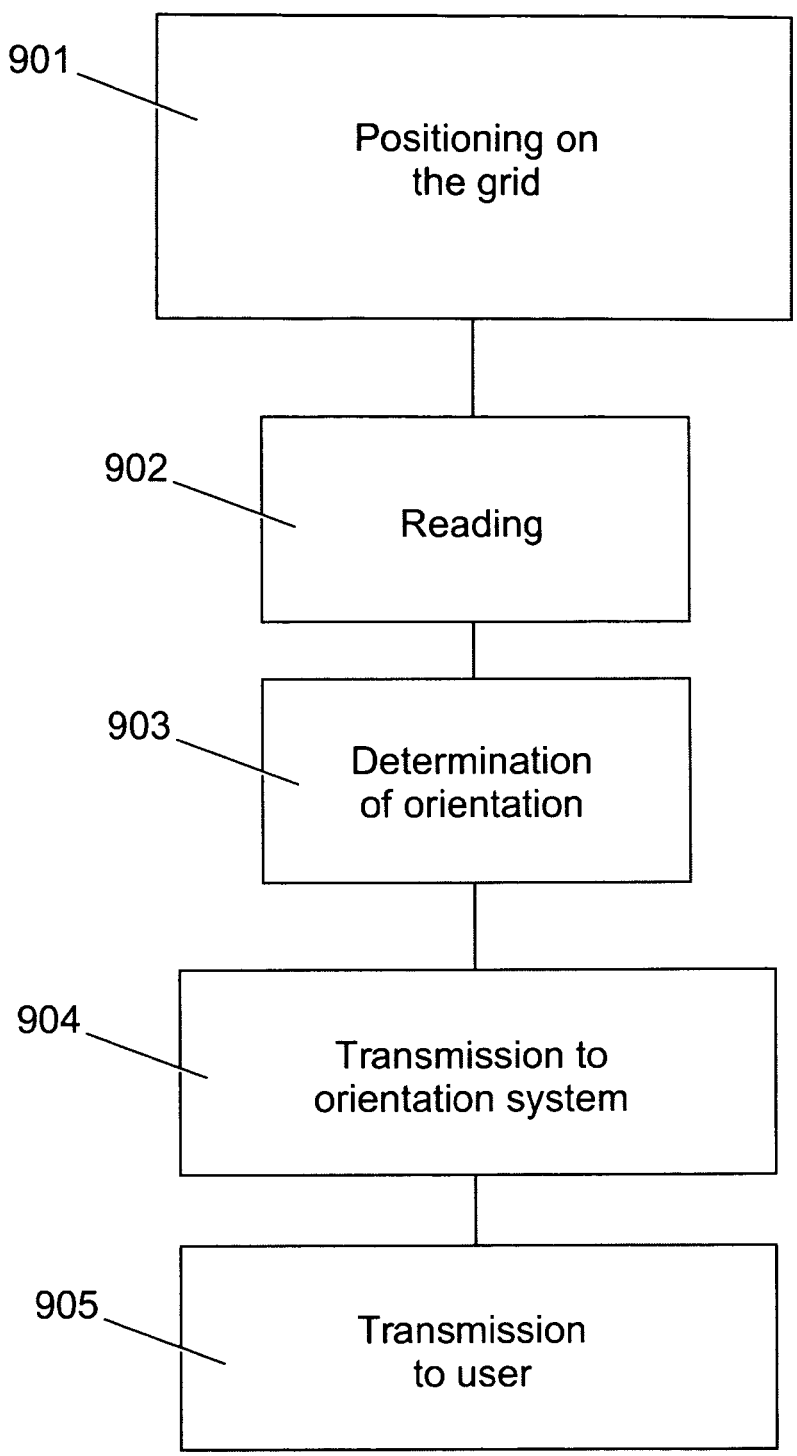
FIG. 9 is a flow chart for illustrating the method according to the present invention.

The different steps of the process of this invention are now described with reference to FIG. 9.

The right shoe is located over a device in step 901 (i.e. the grid pattern composed of the elements). In the right shoe, each tag reader is located on a different element of the grid pattern. These elements are adjacent and correspond to different passive RFID tags each with a different name. For example, as shown in FIG. 6, 601 reader is located on t3 (front right) and 602 reader is located on t5 (middle center). Also, as shown in FIG. 7, 701 reader is located on t3 (front right) and 702 reader is located on t6 (middle right). A reading process 902 will give a result after concatenation of 601 position and 602 position or 701 position and 702 position. Thus as shown in FIG. 6, the reader in step 903 will indicate that the front of the shoe is located in the front right of the grid and for FIG. 7 the reader will indicate that the front of the shoe is located in the front of the grid.

Then the orientation information is transmitted in step 904 to an orientation system. The orientation system will process the information of orientation of the shoe and thus the user in order to determine what direction the user is facing. The orientation system will be able to define what is forwards for the user, backwards for the user, leftwards for the user and/or rightwards for the user.

This information is transmitted in step 905 to a communication system in order to inform the location to the user. This communication can be via an appropriate acoustic system which is either attached to the user or is associated with the grid. For example, if the user is outside, he will receive information concerning street names and relative location. If the user is inside he will receive information concerning the lift locations or information concerning locations of personnel offices for example.

The invention has an advantage that the direction in which the user is facing will be known and will be used to accurately determine information about the surroundings, for example when the user reaches the corner of X street and Y street, the system will identify this location and the fact that X street is in front and Y street to the right.

While the invention has been particularly shown and described with reference to a preferred embodiment, it will be understood that various changes in form and detail may be made therein without departing from the spirit and scope of the invention as defined by the appended claims.

What is claimed is:

1. A system for determining an orientation of a user in a defined space and relative to specified surroundings, said defined space comprising a plurality of functional zones, the system comprising:
   a multitude of first type devices, wherein each of the first type devices is located in one of said zones and includes information relating to the position of said one of the zones in the space;
   a plurality of second type devices attached to the user in defined positions relative to the user, and wherein when the user is in said space, each of two of the first type devices reacts concurrently to the presence of a respective one of the second type devices to provide two concurrent readings at a given moment identifying a current location of each of said respective one of the second type devices in the space; and
   a computing system for processing said two concurrent readings to determine a current orientation of the user and relative to a plurality of specified places at the given moment from said two concurrent readings taken at said given moment.

2. The system of claim 1 wherein each functional zone is a surface mounted zone.

3. The system of claim 2 wherein at least two functional zones are adjacent one to the other.

4. The system of claim 3 wherein the first type device comprises a tag RFID.

5. The system of claim 4 wherein the second type device comprises an RFID reader.

6. The system of claim 5 wherein the second type device is located in a shoe of the user.

7. The system of claim 6 wherein the second type device comprises an RFID reader in the heel of the shoe of the user and another RFID reader in the toe of the shoe of the user.

8. The system of claim 7 wherein each functional zone comprises the first type device securely covered by a rugged material.

9. The system of claim 8 further comprising a communication system in order to provide the information to the user.

10. The system according to claim 1, wherein:
    the plurality of specified places are first and second streets; and
    the computing system identifies a respective location of each of the first and second streets relative to the user.

11. A method of determining an orientation of a user within a defined space and relative to specified surroundings, said defined space comprising a plurality of functional zones, and wherein each functional zone includes one first type device containing information relating to the position of said each functional zone in the space, and a plurality of second type devices are attached to the user in defined positions relative to the user, wherein the first and second type devices can react to one another to transfer data, the method comprising:
    identifying the presence of the user close to a functional zone;
    determining an orientation of the user within the space, including each of two of the first type devices reacting concurrently to the presence of a respective one of the second type devices to provide two concurrent readings at a given moment identifying a current location of each of said respective one of the second type devices in the space, and processing said two concurrent readings to determine a current orientation of the user and relative to a plurality of specified places at the given moment from said two concurrent readings taken at said given moment; and
    providing the user with information relating to the user orientation and to at least one feature in the defined space.

12. The method of claim 11 wherein the identifying step includes identifying the presence of the user in the functional zone.

13. The method of claim 11 wherein the providing step further includes the step of guiding the user toward the one feature.

14. The method according to claim 11, wherein the user is wearing a pair of shoes, and the determining the orientation of the user includes processing said two concurrent readings to determine the orientation of said shoes in the space at the given moment.

15. The method according to claim 11, wherein:
    the plurality of specified places are first and second streets; and
    the determining an orientation of the user includes identifying a respective location of each of the first and second streets relative to the user.

* * * * *